United States Patent
Forget

(10) Patent No.: US 9,657,188 B2
(45) Date of Patent: May 23, 2017

(54) INK FOR PLASTIC SUPPORT

(75) Inventor: Luc Forget, Houffalize (BE)

(73) Assignee: Tarkett SAS, Nanterre (FR)

( * ) Notice: Subject to any disclaimer, the term of this patent is extended or adjusted under 35 U.S.C. 154(b) by 820 days.

(21) Appl. No.: 12/619,132

(22) Filed: Nov. 16, 2009

(65) Prior Publication Data

US 2010/0075152 A1 Mar. 25, 2010
US 2013/0171455 A9 Jul. 4, 2013

Related U.S. Application Data

(63) Continuation of application No. PCT/EP2008/004099, filed on May 22, 2008.

(30) Foreign Application Priority Data

May 25, 2007 (EP) .................................. 07010461

(51) Int. Cl.
*B32B 27/32* (2006.01)
*B32B 27/08* (2006.01)
*B32B 27/40* (2006.01)
*C08L 23/00* (2006.01)
*C09D 11/108* (2014.01)
*B44C 1/10* (2006.01)

(52) U.S. Cl.
CPC ............ *C09D 11/108* (2013.01); *B32B 27/32* (2013.01); *B44C 1/10* (2013.01); *Y10T 428/31587* (2015.04); *Y10T 428/31801* (2015.04)

(58) Field of Classification Search
CPC ......... B32B 27/32; B44C 1/10; C09D 11/108; Y10T 428/31587; Y10T 428/31801
See application file for complete search history.

(56) References Cited

U.S. PATENT DOCUMENTS

| | | | | |
|---|---|---|---|---|
| 3,917,552 A | * | 11/1975 | Bischoff et al. | 524/297 |
| 4,337,183 A | | 6/1982 | Santiago | |
| 5,133,820 A | * | 7/1992 | Katayama et al. | 428/32.7 |
| 5,223,322 A | * | 6/1993 | Colyer et al. | 428/141 |
| 6,166,118 A | * | 12/2000 | Hyche et al. | 524/315 |
| 2006/0141277 A1 | * | 6/2006 | Forget et al. | 428/516 |

FOREIGN PATENT DOCUMENTS

| | | |
|---|---|---|
| EP | 0 604 729 A1 | 7/1994 |
| EP | 1 336 476 A1 | 8/2003 |
| SU | 755824 A1 | 8/1980 |

OTHER PUBLICATIONS

Honeywell; "A-C® Oxidized Polyethylene 392"; article; Jan. 2002; XP002454634; Honeywell International Inc.

* cited by examiner

*Primary Examiner* — Samir Shah
(74) *Attorney, Agent, or Firm* — Reinhart Boerner Van Deuren P.C.

(57) ABSTRACT

The present invention concerns a printing ink for a polyolefin polymer-based support, comprising at least a binder and at least a pigment, said binder being an oxidized polyolefin wax emulsified in water, said wax having a Brookfield viscosity less than 5000 mPa·s at 150° C. and acidity between 28 and 32 mg KOH/g, the viscosity of said ink being less than 2000 mPa·s at 25° C.

10 Claims, 1 Drawing Sheet

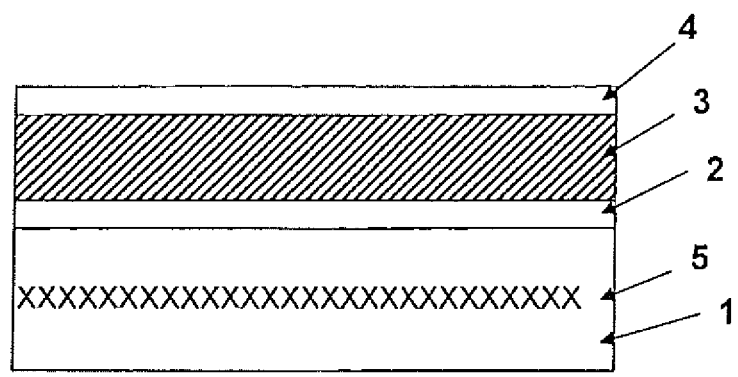

INK FOR PLASTIC SUPPORT

CROSS-REFERENCE TO RELATED PATENT APPLICATIONS

This patent application is a continuation of International Application No. PCT/EP2008/004099, filed May 22, 2008, that claims the benefit of European Application No. 07010461.7, filed May 25, 2007, the entire teachings and disclosure of which are incorporated herein by reference thereto.

PURPOSE OF THE INVENTION

The present invention relates to an ink for olefin polymer-based multilayer product and film, and relates also to decorated multilayer films and products.

BACKGROUND OF PRIOR ART

Generally, an ink comprises one or more pigments and a binder enabling the pigment to be put in suspension, transported and fixed on the support which should be covered and on which patterns are to be printed. The choice of the pigment and the binder are essential as the pigment determines the tinting strength of the ink and the binder determines not only the method of drying of the ink, but also the main characteristics (resistance, adherence . . . ) of the ink layer obtained.

Usually, additives are added to the pigment-binder mixture to optimize the characteristics of the ink during and after its application. They are also used to facilitate the implementation of the ink and accelerate drying, improve gloss, and/or increase the strength of the ink film, among other things.

Among the additives for ink, in particular dispersing agents, anti-foaming agents, as well as waxes, polymers, thickeners and plasticizers can be found. Waxes, of animal, vegetal or mineral origin, are used to modify the surface finish of the ink film and are primarily used to increase friction and abrasion resistance and to improve the sliding coefficient of the ink layer. Polymers, generally nitrocellulose- or ethyl cellulose-based, are used to improve the properties of the ink layer, and to increase its gloss and resistance. They are also used to improve the wetting ability of pigments. Thickeners are used to correct the viscosity of the ink.

The composition of an ink varies according to the support on which it is to be applied and the desired result. The ink must exhibit good intrinsic cohesion and good adhesion to the support. All inks cannot be applied to all supports. Often, commonly used inks are not appropriated for application on plastic films or on multilayer products used in particular as decorative surface coatings.

Printing on plastic films is difficult owing to the fact that these films are often manufactured from non-polar polymers, and the application of an ink requires that a coating, also called "primer" is first applied, or the use of a film surface treatment, such as a corona treatment, which has the disadvantage of introducing one or two additional steps into the manufacturing process of such plastic films.

As for the printing of multilayer products, it presents an additional difficulty; indeed, a multilayer product usually comprises a plastic film, also referred to as the substrate layer or support layer, on which another plastic film is applied, also referred to as the upper layer or wear layer. The function of the wear layer, which is usually transparent, is to protect the decorative face owing to its good resistance to mechanical and chemical aggressions that can arise during normal conditions of use of such multilayer products. Generally, the support layer features a decorative side on which the wear layer is applied. As the decorative design is printed before the wear layer is laid, adhesion problems thus appear between this wear layer and the ink, over and above the adhesion problems between the ink and the support layer. The adhesion between the layers of a multilayer product is crucial as it must meet the strictest criteria, in particular in terms of traffic resistance of the final product in the case of a floor covering.

Among plastic films, PVC (polyvinyl chloride) films are very widespread, in particular in the manufacture of all kinds of packing and packaging, but also in the manufacture of wall and floor coverings. PVC products have the major disadvantage of releasing volatile organic compounds and phthalates into the environment. This is why new more ecological products were developed, chlorine-free products, particularly olefin polymer and copolymer-based products having essentially identical thermal, mechanical and chemical properties, products that are easier to manufacture, less expensive and more ecological to manufacture than PVCs, and that release less volatile organic compounds. Nevertheless, the use of olefin polymers does not solve the adhesion problem between ink and plastic, nor does it provide a solution to the adhesion problem between the support layer and wear layer encountered in the manufacture of multilayer products.

Usually, the surface of the polyolefin film (or the polyolefin support layer in the case of a multilayer product) to be decorated, must be treated before the decorative design is printed. This may involve the application of a "primer" or a physical treatment, particularly a corona treatment as described in document FR2836088.

In the case of a multilayer product, as described in document FR2836088, an adhesion promoter must be applied to the decorative layer in order to improve adhesion between the ink layer and the wear layer. The adhesion promoters cited in document FR2836088 are polyolefin, chlorinated polyolefin, maleic anhydride or hydroxy-functional polyolefin or epoxy-based solutions, acrylic, cross-linked polyester-based solutions or silane-based solutions.

For multilayer products, an alternative solution consists in using an adhesive ink for which the adhesion promoter is an integral part of the ink.

Document EP0604729 describes an adhesive ink for printing on a polyolefin polymer-based support in order to obtain woven and non-woven products in the form of fibers or films. This ink comprises a pigment, a binder, and an adhesion promoter. The binder is either polyvinyl alcohol or ethylene-vinyl acetate (EVA), which are compounds used for their film forming ability, while the adhesion promoter is a compound chosen among hydrocarbon resins, colophane esters or polyterpenes.

The disadvantage of such adhesive inks it that their formulation is complex and not sufficiently adherent to the polyolefin support on which it is applied, as their formulation represents a compromise between the homogeneity of the ink and adhesion to the support. This compromise places their adhesion property as a disadvantage.

PURPOSE OF THE INVENTION

The present invention aims to supply an ink that does not have the disadvantages of the prior art.

In particular, it aims to supply an ink of simplified composition that is easy to implement.

It also aims to supply an ink that has good intrinsic cohesion and improved adhesion to the polyolefin support to which it is applied.

In addition, in the case of a multilayer product, it aims to supply an ink that has improved adhesion to the support layer and/or to the wear layer.

It further aims to supply a decorated film, or a multilayer product, that does not have the disadvantages of the prior art.

In particular, it aims to supply a decorated olefin polymer film, or multilayer product, having better mechanical resistance in terms of physical aggressions.

It also aims to supply a decorated, olefin polymer multilayer product with better internal cohesion.

SUMMARY OF THE INVENTION

The present invention describes a printing ink for a polyolefin polymer-based support, comprising at least a binder and a pigment, said binder being an oxidized polyolefin wax emulsified in water, said wax having a Brookfield viscosity less than 5000 mPa·s at 150° C. and acidity between 28 and 32 mg KOH/g, the viscosity of said ink being less than 2000 mPa·s at 25° C.

The term "oxidized olefin polymer" designates a polymer prepared by polymerization of olefins from olefin monomers and that has undergone an oxidative treatment.

According to special embodiments, the ink comprises one or more of the following characteristics:
  the viscosity of said ink is between 300 and 1000 mPa·s at 25° C.
  the oxidized polyolefin wax is an oxidized high-density ethylene homopolymer.
  in terms of weight, the emulsified oxidized polyolefin wax represents between 35% and 96% of the total weight of the ink.
  the ink further comprises at least an additive selected among the group made up of an anti-foaming agent, a thickener and/or a surface active agent.

The present invention also discloses a high-density ethylene polymer-based support, decorated using the ink according to the invention in which said ink is applied in a continuous or discontinuous manner on at least one face of said support.

The term "support" designates all supports that are suitable to receive an ink, particularly it may be a film.

According to special embodiments, the support comprises the following characteristic:
  the support further comprises mineral fillers.

The present invention also discloses a multilayer product comprising a polyolefin polymer-based support layer, and a polyolefin polymer-based wear layer, in which at least one face of said support layer and/or said wear layer is covered with an ink comprising at least a pigment and a binder, said binder being an oxidized polyolefin wax emulsified in water, said oxidized polyolefin wax having a Brookfield viscosity less than 5000 mPa·s at 150° C. and acidity between 28 and 32 mg KOH/g.

According to special embodiments, the decorated multilayer product comprises one or more of the following characteristics:
  the support layer is high-density ethylene polymer-based.
  the support layer comprises mineral fillers.
  the wear layer comprises a ionomer-type polymer-based layer.
  a polyurethane-based layer is applied to the wear layer.
  the multilayer product is used in the manufacture of floor covering and/or wall covering.

The present invention further discloses a method for manufacturing a multilayer product comprising a polyolefin polymer-based support layer and a polyolefin polymer-based wear layer, said process comprising the following steps:
  Corona treatment of one face of the support layer and/or the wear layer to be printed.
  Application of an ink comprising at least a pigment and a binder to at least one face of the support layer and/or wear layer, said binder being an oxidized polyolefin wax emulsified in water, said oxidized polyolefin wax having a Brookfield viscosity less than 5000 mPa·s at 150° C. and acidity between 28 and 32 mg KOH/g,
  Drying of the ink,
  Application of the wear layer on the support layer,
  Assembly of the wear layer to the support layer.

According to special embodiments, the process comprises one or more of the following characteristics:
  the process further comprises a step for covering the wear layer by a superficial polyurethane-based layer.
  the process further comprises a mechanical graining step of the wear layer after its assembly to the support layer.

BRIEF DESCRIPTION OF FIGURES

The FIGURE represents a multilayer product decorated using the ink according to the invention.

DETAILED DESCRIPTION OF THE INVENTION

The oxidized polyolefin waxes are known per se and are commercially available. It generally concerns polymers, homopolymers or copolymers, obtained by polymerization of olefin monomers, which have undergone oxidation.

The oxidized polyolefin wax, used as a binder in the ink according to the present invention, is a polyolefin polymer having a Brookfield viscosity less than 5000 mPa·s at 150° C. and which has a degree of oxidation (expressed in acidity) between 28 and 32 mg KOH/g, preferably an average degree of oxidation of 30 mg KOH/g. The oxidation of the wax promotes cohesion of the pigment in the ink and allows to obtain optimum adhesion between the ink and film, or the polyolefin support layer and between the ink and the wear layer for multilayer products.

The oxidized polyolefin wax used in the ink according to the invention is a high-density ethylene homopolymer which has been oxidized by all suitable means. In particular, the oxidation can be achieved by reaction with oxygen, or a gas containing oxygen, at temperatures between 140° C. and 200° C. and at pressures ranking from 5 bar to 200 bar.

The pigment used in the ink according to the invention can be all colored substances, mineral or organic, regardless of the structure or nature. It may also involve metallic, iridescent or pearlescent pigments. It may also involve mixes of such pigments.

The pigment is in powder form, although may also be in all other suitable form, and can also be associated with a dispersing agent.

The ink is prepared in the conventional manner, nevertheless before the pigment is incorporated; the wax is previously emulsified in water, the portion of water varying between 55% and 75% by weight; preferably, the portion of water being 65% by weight. Thus, the percentage of dry material, i.e. solid oxidized wax in the emulsion, varies from 25% to 45% by weight, preferably the percentage of solid oxidized wax is 35% by weight.

The ink can further comprise one or more additives, such as, for example, an anti-foaming compound, a thickener, a surface active agent, which are preferably added to the emulsified and oxidized wax before the pigment is incorporated. Preferably, the portion of additive does not exceed 10% by weight of the final ink.

Preferably, the ink according to the invention has a viscosity less than 2000 mPa·s at 25° C.; advantageously, the viscosity is between 300 and 1000 mPa·s at 25° C.

According to a particular embodiment, the wax used is a high-density polyethylene polymer (Solewax 403 by the Ramvers company) having an average acidity of 30 mg KOH/g, and viscosity of 3600 mPa·s at 150° C., and which was emulsified in water. Preferably, the emulsion includes 55% to 75% water by weight; advantageously, 65% water by weight.

Tables 1 to 4 give composition examples of an ink according to the invention.

TABLE 1 composition of a white ink.

| Compound | Percentage in weight |
| --- | --- |
| Oxidized, emulsified HDPE wax | 57.4% |
| White with 70% pigment (Aquapasta White) | 41.0% |
| Anti-foaming (BYK-094) | 0.5% |
| Thickener (Coatex rheo 2000) | 1.1% |

TABLE 2 composition of a metallic ink.

| Ink | Compound | Percentage in weight | Metallic effect |
| --- | --- | --- | --- |
| I | Oxidized, emulsified HDPE wax | 71.4% | Very good |
|   | Metallic pigment (Stapa IL Hydrolan aluminum) | 28.6% |   |
| II | Oxidized, emulsified HDPE wax | 76.9% | Good |
|   | Metallic pigment (Stapa IL Hydrolan Aluminum) | 23.1% |   |
| III | Oxidized, emulsified HDPE wax | 83.3% | Light |
|   | Metallic pigment (Stapa IL Hydrolan Aluminum) | 16.7% |   |

TABLE 3 composition of concentrated colored inks

| Ink | Compound | Percentage in weight |
| --- | --- | --- |
| Black | Oxidized, emulsified HDPE wax | 55.0% |
|   | Pigment (Régal 250R or Monarch 280) | 15.0% |
|   | Pigment dispersing agent | 3.0% |
|   | Water | 21.2% |
|   | Isopropanol | 5.0% |
|   | Surface active agent (Surfynol 104 PA) | 0.8% |
| Yellow | Oxidized, emulsified HDPE wax | 35.0% |
|   | Pigment (Cromophtal Yellow 3G) | 35.0% |
|   | Water | 24.2% |
|   | Isopropanol | 5.0% |
|   | Surface active agent (Surfynol 104 PA) | 0.8% |
| Red | Oxidized, emulsified HDPE wax | 35.0% |
|   | Pigment (Cromophtal red BRN or Cromophtal red 2030) | 35.0% |
|   | Water | 24.2% |

TABLE 3-continued composition of concentrated colored inks

| Ink | Compound | Percentage in weight |
| --- | --- | --- |
|   | Isopropanol | 5.0% |
|   | Surface active agent (Surfynol 104 PA) | 0.8% |
| Blue | Oxidized, emulsified HDPE wax | 35.0% |
|   | Pigment (Irgalite blue GLO) | 35.0% |
|   | Water | 24.2% |
|   | Isopropanol | 5.0% |
|   | Surface active agent (Surfynol 104 PA) | 0.8% |

TABLE 4 composition of the colorless ink

| Compound | Percentage in weight |
| --- | --- |
| Oxidized, emulsified HDPE wax | 95.7% |
| Anti-foaming (BYK 094) | 0.6% |
| Pre-mixture (1:1) (Coatex rheo 2000 + Water) | 3.7% |

The white ink according to the invention (table 1), is obtained using a white that contains 70% white pigment, the remaining 30% consisting of 90% water and 10% acrylic resin. The white ink can itself serve as a support to print one or more colored and/or metallic inks, although it can also be mixed with one or more colored inks, for example, with the inks in table 3. In a white ink/colored ink mixture, the percentage of colored ink by weight preferably represents between 1 and 10% of the weight of the total mixture.

Preferably, for a metallic ink, the pigment used is aluminum coated with silicium dioxide (Stapa IL Hydrolan Aluminum).

The metallic ink according to the invention (table 2) can be used to cover a polyolefin polymer-based support that can or cannot be covered with a white ink, although can itself be used as a support for printing one or more color inks, or a mixture of at least one colored ink with the white ink.

A colored ink (table 3) according to the invention can be used to print a polyolefin polymer-based support that can or cannot be covered with a white ink or a metallic ink. The colored ink can be used as described in table 3, in a "concentrated" form to obtain a dark tint, or used in a "diluted" form, i.e. in the form of a mixture with white ink, metallic ink, or with colorless ink (table 4) to obtain lighter tints.

A colorless ink (table 4) according to the invention can be used to cover a polyolefin polymer-based support that can or cannot be covered with a white, metallic or colored ink. The colorless ink, mixed with one or more "concentrated" colored inks (table 3) can also be used to obtain "diluted" inks in order to obtain lighter tints. Preferably, for a "diluted ink", the proportion by weight of concentrated colored ink is between 1% and approximately 16%.

Thus, in the examples of compositions of an ink according to the invention (tables 1 to 4), the percentage of emulsified and oxidized ink represents between approximately 35% and approximately 83% by weight of the total weight of a white, metallic or concentrated color ink and between approximately 86% and approximately 89% by weight of the total weight of a diluted color ink, and approximately 96% by weight of the total weight of a colorless ink.

The oxidized ink being emulsified in 55% to 75% by weight of water, the percentage of dry oxidized wax material represents, by weight, between approximately 9% and approximately 37% of the total weight of the white, metallic or concentrated color ink and between approximately 21% and approximately 40% by weight of the total weight of a diluted colored ink, and approximately 43% by weight of the total weight of a colorless ink.

In a particular embodiment of the invention, the oxidized wax is emulsified in 65% of water, thus the percentage of dry oxidized wax material represents, by weight, between approximately 12% and approximately 29% of the total weight of the white, metallic or concentrated colored ink and approximately 30% by weight of the total weight of the diluted colored ink, and approximately 33% of the total weight of a colorless ink.

All the compositions of tables 1 to 4 have adhesion greater than 50N/50 mm based on a peel strength test conducted in accordance with European standard No. EN431. In particular, the white ink comprising 57.4% by weight of the emulsified oxidized wax, a metallic ink at approximately 71% by weight of emulsified oxidized wax and a concentrated colored ink at approximately 35% of emulsified oxidized wax, have good adhesion to the polyolefin support while having a sufficient aesthetic appearance.

The plastic films, or multilayer product support layers, decorated using one or more inks according to the invention, are preferably high-density ethylene polymer-based films or support layers. Preferably, these films are obtained by lamination or calendering.

In particular, as shown in FIG. 1, the support layer 1 of a multilayer product can be a compact or foam layer. It can comprise organic or mineral fillers intended to provide specific mechanical properties. This may be, for example, magnesium or calcium carbonate, calcium sulphate, barium sulphate or carbonate, kaolin, pyrogenic silica, expanded graphite, or glass fiber. In a particular embodiment, the support layer is a low-density polyethylene and comprises calcium carbonate and a glass fiber mat 2.

The ink according to the present invention can be applied to at least one surface of the polyolefin film, support layer 1 or wear layer 3, by all suitable means. Preferably, the ink is applied by heliography, flexography or screen. The application can be carried out continuously, over the entire surface of the film, the support layer 1 or the wear layer 3, or in a discontinuous manner, on only one part of the surface of the film, support layer 1 or wear layer 3.

The colored, metallic, white or colorless ink layer 2 has the advantage of itself being used as a support for printing an additional pattern.

Once the ink layer 2 is applied, the decorated film, the support layer 1 or the wear layer 3, thus decorated is dried, for example by forced air, for example at a temperature between 20° C. and 100° C.

The wear layer 3 of a multilayer product can be a polymer multilayer or a single-layer and can be produced from all suitable polymer in order to provide it good resistance to mechanical and chemical aggressions that occur in the normal conditions of use of such surface coverings. The wear layer can comprise an ionomer type polymer layer, copolymers with ionic links comprising an olefin chain containing carboxylic lateral groups, partially or totally neutralized by cations that may be metallic cations or amine cations. Preferably, the ionomer polymer is an ethylene copolymer.

The wear layer 3 is preferably transparent and is generally at least 10 μm thick, preferably, 200 μm, although it can vary according to various parameters such as the material used to produce the wear layer 3, although also according to the applications for which the multilayer product is to be used.

Preferably, the support layer 1 is manufactured by calandering and the wear layer 3 is manufactured by extrusion-blow molding.

The wear layer 3 is applied hot, for example, advantageously at a temperature between 110° C. and 120° C., and in a particularly preferred manner at 115° C., to a support layer 1 whose surface has been previously heated, by IR for example. The wear layer 3 adheres to the support layer 1, for example, by placing the multilayer product in an oven at 160° C. for three minutes.

According to a particular embodiment, the wear layer 3 is covered by a superficial polyurethane-based layer 4 in order to reinforce the abrasion wear resistance.

According to another particular embodiment, the multilayer product can undergo mechanical graining.

Preferably, the support layer 1 or the wear layer 3 of a multilayer product can contain various additives enabling the mechanical properties of the final decorated multilayer product to be improved or modified.

Preferably, the films decorated with the ink according to the present invention are used as packaging, and the decorated multilayer products are used as wall or floor coverings.

KEY

1: support layer
2: ink layer
3: wear layer
4: polyurethane layer
5: glass fiber mat

The invention claimed is:

1. A multilayer product comprising a polyolefin polymer-based support layer, and a polyolefin polymer-based wear layer, in which at least one face of said support layer and/or said wear layer is covered with an ink consisting of from 35% to 84% by weight of one binder, from 15% to 41% by weight of at least one pigment and optionally with the balance of 100% by weight of at least one pigment and optionally with the balance to 100% by weight of one or more additives selected from the group consisting of water, anti-foaming agent, thickener, pigment dispersing agent, surface active agent, up to 5% by weight of isopropanol, and combinations thereof, said binder consisting of an oxidized polyolefin wax emulsified in water, said oxidized polyolefin wax being a high-density polyethylene polymer and having a Brookfield viscosity less than 5000 mPa·s at 150° C. and acidity between 28 and 32 mg KOH/g; wherein the support layer and the wear layer are connected by the ink.

2. The multilayer product according to claim 1 in which the support layer is high-density ethylene polymer-based.

3. The multilayer product according to claim 1 in which the support layer comprises mineral fillers.

4. The multilayer product according to claim 1 in which the wear layer comprises an ionomer polymer-based layer.

5. The multilayer product according to claim 1 in which a polyurethane-based layer is applied to the wear layer.

6. The multilayer product, according to claim 1, wherein the multilayer product is a floor covering and/or a wall covering.

7. The multilayer product according to claim 1, wherein the ink covers one face of the support layer and one face of the wear layer.

8. The multilayer product of claim 1, wherein the ink is an ink layer, the ink layer includes a first side and a second side, the first side is in contact with the wear layer and the second side is in contact with the support layer, and wherein the ink has an adhesion greater than 50N/50 mm based on a peel strength test in accordance with European standard No. EN431.

9. The multilayer product as claimed in claim 1, wherein the emulsified oxidized polyolefin wax comprises a percentage of 25% to 45% of dry material.

10. The multilayer product as claimed in claim 1, wherein said pigment comprises at least one of a metallic pigment, a white pigment, a black pigment, a yellow pigment, a red pigment and a blue pigment.

* * * * *

UNITED STATES PATENT AND TRADEMARK OFFICE
CERTIFICATE OF CORRECTION

| | | |
|---|---|---|
| PATENT NO. | : 9,657,188 B2 | |
| APPLICATION NO. | : 12/619132 | |
| DATED | : May 23, 2017 | |
| INVENTOR(S) | : Luc Forget | |

It is certified that error appears in the above-identified patent and that said Letters Patent is hereby corrected as shown below:

In the Claims

Column 8 Line 39:
Claim 1, Lines 7-8, please delete "of 100% by weight of at least one pigment and optionally with the balance"

Signed and Sealed this
Tenth Day of October, 2017

Joseph Matal
*Performing the Functions and Duties of the*
*Under Secretary of Commerce for Intellectual Property and*
*Director of the United States Patent and Trademark Office*